United States Patent Office 3,178,477
Patented Apr. 13, 1965

3,178,477
α-ARALKYL-SUBSTITUTED-BENZYLAMINES
Ernst Seeger and August Kottler, Biberach on the Riss, Germany, assignors, by mesne assignments, to Boehringer Ingelheim G.m.b.H., Ingelheim (Rhine), Germany, a corporation of Germany
No Drawing. Filed Oct. 18, 1962, Ser. No. 231,590
Claims priority, application Germany, Dec. 28, 1954, T 10,392
4 Claims. (Cl. 260—570.5)

This is a continuation-in-part of copending application Serial No. 6,617, filed February 4, 1960, now abandoned, which in turn is a continuation-in-part of application Serial No. 710,186, filed January 21, 1958, now abandoned, which in turn is a continuation-in-part of application Serial No. 544,385, filed September 21, 1955, now abandoned.

This invention relates to novel tertiary amines having useful pharmacological properties and their non-toxic acid addition salts.

More particularly, the present invention relates to tertiary amines of the formula

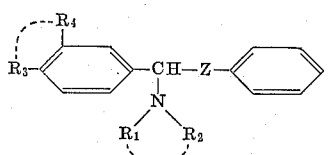

(I)

wherein $R_1$ and $R_2$ are selected from the group consisting of methyl, ethyl and, together with each other and the adjacent nitrogen atom, piperidino and pyrrolidino,
$R_3$ is selected from the group consisting of methyl, methoxy and ethoxy,
$R_4$ is selected from the group consisting of hydrogen and, together with $R_3$, methylenedioxy, and Z is selected from the group consisting of straight and branched alkylene of three carbon atoms, and their pharmacologically useful, non-toxic acid addition salts.

The tertiary amines defined by Formula I above are advantageously produced by reacting an α-tertiary aminoacetonitrile of the formula

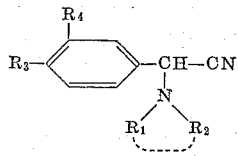

(II)

wherein $R_1$, $R_2$, $R_3$ and $R_4$ have the same meanings as in Formula I, with a phenylalkyl-magnesium-halide of the formula

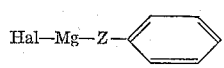

(III)

wherein Z has the same meanings as in Formula I and Hal represents a halogen selected from the group consisting of chlorine, bromine and iodine. The reaction between compounds II and III is advantageously carried out in the presence of a suitable organic solvent, such as ether or benzene, or a mixture of organic solvents, such as benzene and tetrahydrofuran. The preferred method consists of refluxing the reaction mixture at the boiling point of the particular solvent employed as the reaction medium at atmospheric pressure, although the reaction will also proceed at moderately elevated temperatures below the boiling point of the solvent and without reflux.

The resulting free tertiary amines may be readily converted into their non-toxic acid addition salts by the methods customarily used for converting basic organic amino compounds into their acid addition salts, as illustrated below.

The following examples will illustrate the preparation of various representative compounds of the group defined by Formula I above and will enable others skilled in the art to understand the present invention more completely. It should be understood, however, that the invention is not limited to the particular compounds illustrated in these examples.

EXAMPLE 1

1-(3,4-methylenedioxy-phenyl)-1-piperidino-4-phenyl-butane 8 gm. of 3,4-methylenedioxy-phenyl-piperidino-acetonitrile were dissolved in 40 cc. anhydrous ether. The resulting solution was added dropwise to a Grignard reagent prepared from 2.3 gm. magnesium turnings and 19.9 gm. γ-phenyl-propyl-bromide in 50 cc. anhydrous ether. The mixture was boiled for 1½ hours. The resulting reaction mixture was decomposed by adding ice and dilute hydrochloric acid thereto. The ethereal layer was separated. Some ammonium chloride was added to the aqueous layer, which was then made alkaline with ammonia. The oil which precipitated was dissolved in ether and the ethereal solution was dried over sodium sulfate. After evaporation of the ether, the compound of the formula

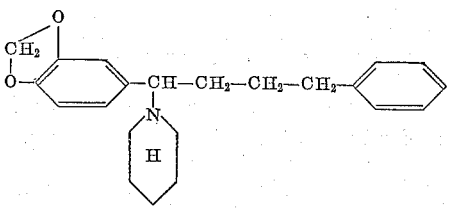

was obtained. The yield was 63% of theory.

By dissolving the amine in ether and adding thereto an ethereal solution of hydrochloric acid, its colorless crystalline hydrochloride having a melting point of 165–167° C. was obtained. On analysis, a nitrogen content of 3.78% was found (calculated: 3.75%).

The following table illustrates additional tertiary amines of the Formula I above which were produced by the method described in Example 1, and lists their boiling points, the melting point of the hydrochloride, the acetonitrile and Grignard reagents used, and the yield in each case.

| Example No. | Tertiary Amine Produced | B.P., °C./mm. Hg | M.P. of hydrochloride, °C. | Acetonitrile Reagent | Grignard Reagent from magnesium and— | Yield percent of theory |
|---|---|---|---|---|---|---|
| 2 | 1-(3,4-methylene-dioxy-phenyl)-1-dimethyl-amino-4-phenyl-butane. | | 185 | (3,4-methylenedioxy-phenyl)-dimethylamino-acetonitrile.9 | γ-Phenyl-propyl-bromide. | 90 |
| 3 | 1-(3,4-methylene-dioxy-phenyl)-1-piperidino-3-methyl-3-phenyl-propane. | 178/0.05 | | (3,4-methylenedioxy-phenyl)-piperidyl-(1)-acetonitrile. | (β-Bromo-isopropyl)-benzene. | 70 |
| 4 | 1-(4-ethoxy-phenyl)-1-dimethyl-amino-3-methyl-3-phenyl-propane. | 131/0.05 | | (4-ethoxy-phenyl)-dimethyl-amino-aceto-nitrile. | ____do____ | 79 |
| 5 | 1-(4-methoxy-phenyl)-1-dimethylamino-3-methyl-3-phenyl-propane. | 128/0.2 | | (4-methoxy-phenyl)-dimethyl-amino-aceto-nitrile. | ____do____ | 74 |
| 6 | 1-(4-methoxy-phenyl)-1-dimethylamino-4-phenyl-butane. | 160/0.3 | 148 | ____do____ | γ-Phenyl-propyl bromide. | 80 |
| 7 | 1-(4-methoxy-phenyl)-1-dimethylamino-3-methyl-3-phenyl-propane. | 128/0.2 | [1] 215 | ____do____ | β-Bromo-isopropyl-benzene. | 74 |
| 8 | 1-(4-methoxy-phenyl)-1-diethylamino-4-phenyl-butane. | 146–147/0.15 | 119 | ____do____ | γ-Phenyl-propyl-bromide. | 71 |
| 9 | 1-(4-methoxy-phenyl)-1-diethylamino-3-methyl-3-phenyl-propane. | 134–135/0.03 | 136 | ____do____ | β-Bromo-isopropyl-benzene. | 71 |
| 10 | 1-(4-methoxy-phenyl)-1-pyrrolidino-4-phenyl-butane. | 185/0.3 | 146 | (4-methoxy-phenyl)-pyrrolidino-aceto-nitrile. | γ-Phenyl-propyl-bromide. | 65 |
| 11 | 1-(4-methoxy-phenyl)-1-pyrrolidino-3-methyl-3-phenyl-propane. | 150/0.02 | | ____do____ | β-Bromo-isopropyl-benzene. | 62 |
| 12 | 1-(4-methoxy-phenyl)-1-piperidino-4-phenyl-butane. | | 152 | (4-methoxy-phenyl)-piperidino-acetonitrile. | γ-Phenyl-propyl-bromide. | 83 |
| 13 | 1-(4-methoxy-phenyl)-1-piperidino-3-methyl-3-phenyl-propane. | 156/0.1 | [2] 194–195 | ____do____ | β-Bromo-isopropyl-benzene. | 62 |
| 14 | 1-(4-methyl-phenyl)-1-(dimethyl-amino-4-phenyl-butane. | 154/0.5 | 179 | (4-methyl-phenyl)-dimethyl-amino-acetonitrile. | γ-Phenyl-propyl-bromide. | 51 |
| 15 | 1-(4-methyl-phenyl)-1-dimethyl-amino-3-methyl-3-phenyl-propane. | 95/0.06 | | ____do____ | β-Bromo-isopropyl-benzene. | 68 |
| 16 | 1-(4-methyl-phenyl)-1-diethyl-amino-4-phenyl-butane. | 146/0.2 | | (4-methyl-phenyl)-diethylamino-acetonitrile. | γ-Phenyl-propyl-bromide. | 62 |
| 17 | 1-(4-methyl-phenyl)-1-pyrrolidino-4-phenyl-butane. | 168/0.4 | | (4-methyl-phenyl)-pyrrolidino-acetonitrile. | ____do____ | 82 |
| 18 | 1-(4-methyl-phenyl)-1-piperidino-4-phenyl-butane. | 184/0.6 | 122 | (4-methyl-phenyl)-piperidino-acetonitrile. | ____do____ | 68 |
| 19 | 1-(3-methylenedioxy-phenyl)-1-dimethyl-amino-4-phenyl-butane. | | 185 | (3,4-methylenedioxy-phenyl)-dimethylamino-acetonitrile. | ____do____ | 90 |
| 20 | 1-(3,4-methylenedioxy-phenyl)-1-dimethyl-amino-3-methyl-3-phenyl-propane. | 141–142/0.15 | 221 | ____do____ | β-Bromo-isopropyl-benzene. | 70 |
| 21 | 1-(3,4-methylenedioxy-phenyl)-diethylamino-4-phenyl-butane. | 162/0.02 | | (3,4-methylenedioxy-phenyl)-diethylamino-acetonitrile. | γ-Phenyl-propyl-bromide. | 62 |
| 22 | 1-(3,4-methylenedioxy-phenyl)-1-pyrrolidino-4-phenyl-butane. | 196/0.8 | 202 | (3,4-methylenedioxy-phenyl)-pyrrolidino-acetonitrile. | ____do____ | 56 |
| 23 | 1-(4-methyl-phenyl)-1-diethyl-amino-3-methyl-3-phenyl-propane. | 130/0.15 | 145–146 | (4-methyl-phenyl)-diethylamino-acetonitrile. | β-Bromo-isopropyl-benzene. | 71 |
| 24 | 1-(4-methyl-phenyl)-1-piperidino-3-methyl-3-phenyl-propane. | 140–142/0.03 | 175 | (4-methyl-phenyl)-piperidino-acetonitrile. | ____do____ | 72 |
| 25 | 1-(4-ethoxy-phenyl)-1-dimethyl-amino-3-methyl-3-phenyl-propane. | 131/0.05 | [3] 217–218 | (4-ethoxy-phenyl)-dimethyl-amino-acetonitrile. | ____do____ | 79 |
| 26 | 1-(4-ethoxy-phenyl)-1-dimethyl-amino-3-methyl-3-phenyl-propane. | 152/0.1 | [4] 179 | (4-ethoxy-phenyl)-diethylamino-acetonitrile. | ____do____ | 93 |
| 27 | 1-(4-ethoxy-phenyl)-1-pyrrolidino-4-phenyl-butane. | 178–179/0.15 | 147–148 | (4-ethoxy-phenyl)-pyrrolidino-acetonitrile. | γ-Phenyl-propyl-bromide. | 75 |
| 28 | 1-(4-ethoxy-phenyl)-1-pyrrolidino-3-methyl-3-phenyl-propane. | 171/0.2 | 142 | ____do____ | β-Bromo-iso-propyl-benzene. | 75 |
| 29 | 1-(4-ethoxy-phenyl)-1-piperidino-3-methyl-3-phenyl-propane. | 177/0.25 | 181 | (4-ethoxy-phenyl)-piperidino-acetonitrile. | ____do____ | 89 |
| 30 | 1-(3,4-methylenedioxy-phenyl)-1-diethylamino-3-methyl-3-phenyl-propane. | 164/0.25 | 186 | (3,4-methylenedioxy-phenyl)-diethylamino-acetonitrile. | ____do____ | 68 |

[1] Recrystallized from isopropanol. M.P. from ethylacetate 135° C.
[2] Decomposition.
[3] (Recrystallized from isopropanol) 132 (from ethylacetate).
[4] (Recrystallized from acetone) 135–138 (from ethylacetate).

As previously stated and illustrated in the preceding examples, the tertiary amines according to the present invention form non-toxic, pharmacologically useful acid addition salts. It is well known in the pharmacological arts that the non-toxic acid addition salts of basic pharmacologically active amines do not materially differ from the free amines themselves in their pharmacological effects. The acid addition salts merely provide a desirable solubility factor. So it is with the present tertiary amines.

Typical examples of pharmacologically useful non-toxic acid addition salts of the present tertiary amines are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicyclic acid, nicotinic acid, 2-furoic acid and the like. The hydrochlorides, however, have been found to be particularly suitable for practical purposes.

The group of compounds embraced by Formula I above are useful and effective pharmacological agents. More particularly, they exhibit papaverine-like myotropic spasmolytic activities, as well as hypotensive, vasodilating, coronary blood flow enhancing and cough suppressing activities as well as a specific spasmolytic action upon the uterus.

The tertiary amines embraced by Formula I above or their non-toxic, pharmacologically useful acid addition salts may be administered in the form of dosage unit compositions consisting essentially of from 20 to 200 mgm., preferably 100 mgm., of one or more of said tertiary amines or their non-toxic acid addition salts in uniform admixture with a physiologically compatible inert carrier substance.

The effective single dose of the compounds according to the present invention is 20–200 mgm., preferably 100 mgm.

The following examples illustrate various dosage unit compositions comprising non-toxic acid addition salts of the tertiary amines of the present invention as active ingredients. The dosage unit compositions may, however, also contain one or more other active ingredients, as illustrated in Example 40 below. The parts are parts by weight unless otherwise indicated.

EXAMPLE 31

Tablets

The tablets are compounded from the following ingredients:

| | Parts |
|---|---|
| 1 - (4 - ethoxyphenyl)-1-diethylamino-3-methyl-3-phenyl-propane·HCl | 100.0 |
| Colloidal silicic acid | 100.0 |
| Lactose | 100.0 |
| Corn starch | 94.0 |
| Tartaric acid | 4.0 |
| Magnesium stearate | 2.0 |
| Total | 400.0 |

*Compounding procedure.*—The tertiary amine salt, the silicic acid, the lactose and the corn starch are admixed with each other, the resulting mixture is thoroughly kneaded with a 2% solution of the tartaric acid in ethanol, and the moist mass is forced through a 1.5 mm.-mesh screen. The resulting moist granulate is dried at 40° C. and is again passed through a 1.5 mm.-mesh screen. The magnesium stearate is added and uniformly admixed with the dry granulate, and the mixture is pressed into tablets weighing 400 mgm. each.

EXAMPLE 32

Coated pills

The tablets produced in accordance with Example 35 are provided by customary methods with a thin shell consisting essentially of sugar and talcum. The finished pills are then polished with beeswax. Each coated pill weighs approximately 600 mgm. and contains 100 mgm. of the tertiary amine active ingredient.

EXAMPLE 33

Injectable solution in ampules

The hypodermic solution is compounded from the following ingredients:

| | |
|---|---|
| 1 - (4 - ethoxyphenyl)-1-dimethylamino-3-methyl-3-phenyl-propane·HCl mgm | 75.0 |
| Citric acid·H$_2$O mgm | 12.6 |
| 1 N NaOH ml | 0.12 |
| 0.1 N HCl ml | 0.68 |
| Distillated water, q.s. ad 2.0 ml. | |

*Compounding procedure.*—The citric acid, the sodium hydroxide, the hydrochloride acid and the tertiary amine salt are dissolved in a sufficient amount of distilled water, and the resulting solution is diluted to the required volume. The finished hypodermic solution is filtered until free from suspended particles and is filled into a 2 ml. ampule. The ampule is then sterilized for 20 minutes at 120° C.

EXAMPLE 34

Suppositories

The suppositories are compounded from the following ingredients:

| | Parts |
|---|---|
| 1 - (4 - methoxyphenyl)-1-dimethylamino - 3-methyl-3-phenyl-propane·HCl | 100.0 |
| Cocoa butter | 1,600.0 |
| Total | 1,700.0 |

*Compounding procedure.*—The cocoa butter is melted, and at 35° C. the finely powdered tertiary amine salt is stirred into the molten mass. The resulting mixture is poured into cooled suppository molds having a capacity of 1.7 gm. of the mixture. Each suppository weighs 1.7 gm. and contains 100 mgm. of the active ingredient.

EXAMPLE 35

Gelatin capsules

The contents of the capsules are compounded from the following ingredients:

| | Parts |
|---|---|
| 1,4-diphenyl-1-piperidinobutane·HCl | 100.0 |
| Colloidal silicic acid | 2.0 |
| Total | 102.0 |

*Compounding procedure.*—The tertiary amine salt is thoroughly admixed with the colloidal silicic acid, and the resulting mixture is forced through a 1 mm.-mesh screen. 102 mgm. portions of the mixture are filled into individual gelatin capsules of suitable size. Each capsule contains 100 mgm. of the active ingredient.

EXAMPLE 36

Coated pills with additional active ingredients

The pill cores are compounded from the following ingredients:

| | Parts |
|---|---|
| 1-(4-ethoxyphenyl)-1-diethylamino - 3 - methyl-3-phenyl-propane·HCl | 75.0 |
| 4 - dimethylamino-2,3-dimethyl-1-phenyl-3-pyrazolin-5-one | 300.0 |
| Caffeine | 50.0 |
| Glycerin | 6.0 |
| Potato starch | 5.0 |
| Corn starch | 150.0 |
| Soluble starch | 6.0 |
| Magnesium stearate | 8.0 |
| Total | 600.0 |

*Compounding procedure for 1000 pills.*—(a) The tertiary amine salt is moistened with a mixture of 8 gm. carbon tetrachloride and 2.5 gm. ethanol, the moist mass is passed through a 1.5 mm.-mesh screen, and the resulting granulate is dried at 40° C. The dried granulate is again passed through the 1.5 mm.-mesh screen.

(b) The pyrazolone compound and the caffeine are moistened with a 10% aqueous paste of the potato starch, which also contains the glycerin, and the resulting moist mass is granulated and dried as in (a).

(c) The corn starch is moistened with a 8% aqueous solution of the soluble starch, and the resulting moist mass is granulated and dried as in (a).

The granulates obtained in (a), (b) and (c) are admixed with each other and with the magnesium stearate. The resulting mixture is pressed into oval pill cores of 600 mgm. each. The pill cores are then provided with a thin shell consisting essentially of sugar and talcum in customary fashion, and the coated pills are finally polished with beeswax. Each pill weighs approximately 850 mgm. and contains 75 mgm. of the tertiary amine salt, 300 mgm. of the pyrazolone compound and 50 mgm. of caffeine.

It is obvious that the particular dosage unit examples given above are merely illustrative of the various types which may be used to administer the compounds of the present invention. Those skilled in the art will realize that the particular tertiary amine ingredient in any of these specific examples may be replaced by any other tertiary amine embraced by Formula I or its non-toxic acid addition salts, and that the amounts of the tertiary amine components may be varied within the indicated limits to suit the requirements.

While we have illustrated the present invention with the aid of certain specific embodiments thereof, it will be readily apparent to those skilled in the art that the invention is not limited to these embodiments, and that various changes and modifications may be made without departing from the spirit of the invention or the scope of the appended claims.

We claim:
1. A compound selected from the group consisting of tertiary amines of the formula

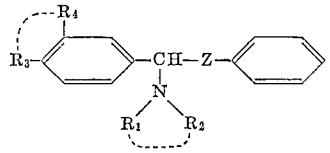

$R_1$ and $R_2$ are selected from the group consisting of methyl, ethyl and, together with each other and the adjacent nitrogen atom, piperidino and pyrrolidino, $R_3$ is selected from the group consisting of methyl, methoxy and ethoxy, $R_4$ is selected from the group consisting of hydrogen and, together with $R_3$, methylenedioxy, and Z is alkylene of 3 carbon atoms, and their non-toxic, pharmacologically useful acid addition salts.

2. 1-(4-methoxy-phenyl)-1-dimethylamino - 3 - methyl-3-phenyl-propane.

3. 1-(4-ethoxy-phenyl)-1-dimethylamino - 3 - methyl-3-phenyl-propane.

4. 1-(4-ethoxy-phenyl)-1-diethylamino - 3 - methyl-3-phenyl-propane.

References Cited in the file of this patent
UNITED STATES PATENTS

| | | |
|---|---|---|
| 2,437,370 | Wilson | Mar. 9, 1948 |
| 2,976,213 | Murphey | Mar. 21, 1961 |
| 3,002,997 | Green | Oct. 3, 1961 |
| 3,053,736 | Abood | Sept. 11, 1962 |

UNITED STATES PATENT OFFICE
CERTIFICATE OF CORRECTION

Patent No. 3,178,477  April 13, 1965

Ernst Seeger et al.

It is hereby certified that error appears in the above numbered patent requiring correction and that the said Letters Patent should read as corrected below.

Columns 3 and 4, in the table, under the heading "Acetonitrile Reagent", line 2 thereof, strike out "9"; same columns, same table, under the heading "Tertiary Amine Produced" opposite Examples No. 12 and 20, after "phenyl", each occurrence insert a closing parenthesis; column 8, line 1, before "$R_1$" insert -- wherein --.

Signed and sealed this 24th day of August 1965.

(SEAL)
Attest:

ERNEST W. SWIDER
Attesting Officer

EDWARD J. BRENNER
Commissioner of Patents